(12) United States Patent
Meng

(10) Patent No.: US 11,389,915 B2
(45) Date of Patent: Jul. 19, 2022

(54) MACHINE FOR MAKING SCREWDRIVER BIT SOCKETS

(71) Applicant: Ji-Fen Meng, Taichung (TW)

(72) Inventor: Ji-Fen Meng, Taichung (TW)

( * ) Notice: Subject to any disclaimer, the term of this patent is extended or adjusted under 35 U.S.C. 154(b) by 187 days.

(21) Appl. No.: 16/945,949

(22) Filed: Aug. 3, 2020

(65) Prior Publication Data

US 2022/0032410 A1 Feb. 3, 2022

(51) Int. Cl.
*B23P 19/06* (2006.01)
*B25B 23/00* (2006.01)
*B25B 15/00* (2006.01)
*B25B 21/00* (2006.01)
*B25D 17/00* (2006.01)

(52) U.S. Cl.
CPC ............ *B23P 19/06* (2013.01); *B25B 21/007* (2013.01); *B25B 23/0035* (2013.01); *B25D 17/005* (2013.01); *B25B 15/00* (2013.01)

(58) Field of Classification Search
CPC .......... B23Q 3/069; B23Q 7/14; B23Q 7/141; B23Q 7/16; B23P 19/004; B23P 19/06; B23P 19/006; B23P 19/008; B23P 19/02; B23P 19/12; Y10T 29/53704; Y10T 29/53796; Y10T 29/53826; Y10T 29/5383; Y10T 29/53839; Y10T 29/53961; Y10T 29/5397; Y10T 29/53974; Y10T 29/53983; B25B 11/02; B25B 21/007; B25B 23/0035; B25B 15/00; B25D 17/005

USPC ...................................................... 29/525.01
See application file for complete search history.

(56) References Cited

U.S. PATENT DOCUMENTS

| 4,962,583 A * | 10/1990 | Yang ......................... B23Q 5/40 29/563 |
| 9,937,594 B2 * | 4/2018 | Matake .................. B23Q 3/069 |
| 10,760,607 B2 * | 9/2020 | Iwano ................... F16B 5/0208 |

FOREIGN PATENT DOCUMENTS

CN 108637639 A * 10/2018 .............. B23P 19/00

OTHER PUBLICATIONS

CN-108637639—Machine Translation (Year: 2018).*

* cited by examiner

*Primary Examiner* — Monica S Carter
*Assistant Examiner* — Alberto Saenz

(57) ABSTRACT

A machine for making screwdriver bit sockets includes a feeing unit and a rotary unit located beside the feeding unit. The rotary unit includes a feeding area, a put-in area, a pressing area and a ready area. The rotary unit includes a disk rotatably connected to a base. Multiple holding units are connected to the disk and moved to one of the feeding area, the put-in area, the pressing area and the ready area when the disk rotates. A feeding arm is located beside the pick-up area and the feeding area to move the sockets from the pick-up area to the holding units. A pressing unit located above the pressing area to press a screwdriver to a socket. A pick-up arm picks up the sockets from the holding units. A control unit electrically controls the rotary unit, the feeding arm, the pressing unit and the pick-up arm.

4 Claims, 15 Drawing Sheets

MACHINE FOR MAKING SCREWDRIVER BIT SOCKETS

BACKGROUND OF THE INVENTION

1. Fields of the Invention

The present invention relates to a machine for making screwdriver bit sockets with less labor needed.

2. Descriptions of Related Art

The conventional screwdriver bit sockets are used to be cooperated with a socket wrench, and are made by a machine 400 as disclosed in FIG. 18, wherein the machine includes an operation area 200, and a pressing unit 300 is located above the operation area 200. The users transport the sockets and the screwdriver bits to the machine 400, and put one screwdriver bit onto a socket. The combination of the screwdriver bit and the socket is moved to the operation area 200. The pressing unit 300 is then lowered to press the screwdriver bit in the socket. However the user's hand is exposed in the operation area 200 and may be injured by the pressing unit 200.

The present invention intends to provide a machine for making screwdriver bit sockets to eliminate shortcomings mentioned above.

SUMMARY OF THE INVENTION

The present invention relates to a machine for making screwdriver bit sockets, and comprises a feeding unit having a pick-up area for collecting sockets to the pick-up area. A rotary unit is located beside the feeding unit, and includes a feeding area, a put-in area, a pressing area and a ready area. The rotary unit includes a disk rotatably connected to a base. Multiple holding units are connected to the top of the disk, and the holding units are movable to one of the feeding area, the put-in area, the pressing area and the ready area when the disk rotates. A feeding arm is located beside the pick-up area and the feeding area. The feeding arm is configured to move the sockets from the pick-up area to the holding units. A pressing unit includes a head which is retractably located above the pressing area. A pick-up arm is located beside the ready area and configured to pick up the sockets from the holding units. A control unit is electrically connected to the rotary unit, the feeding arm, the pressing unit and the pick-up arm.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
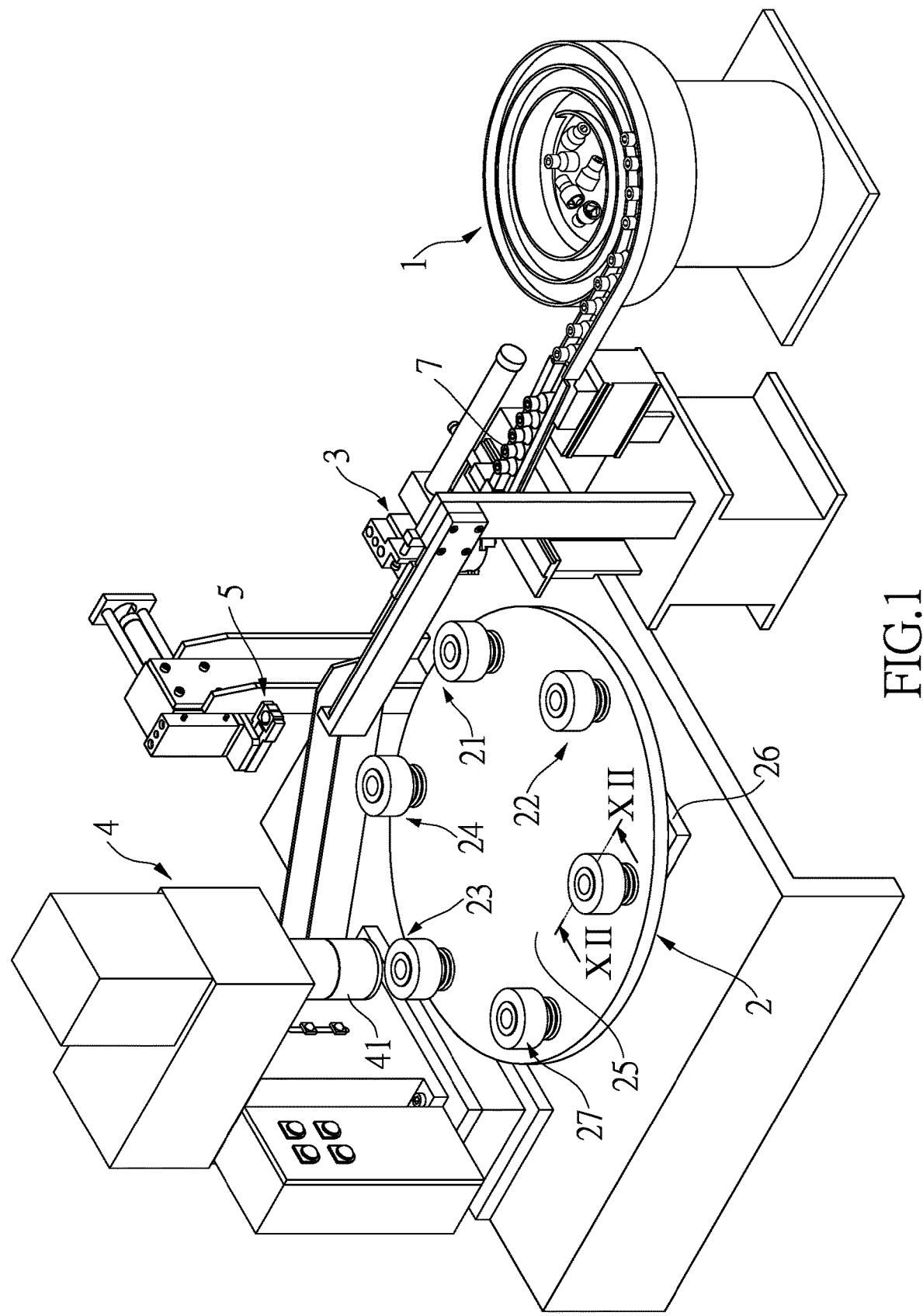
FIG. 1 is a perspective view to show the machine of the present invention.
Figure 2:
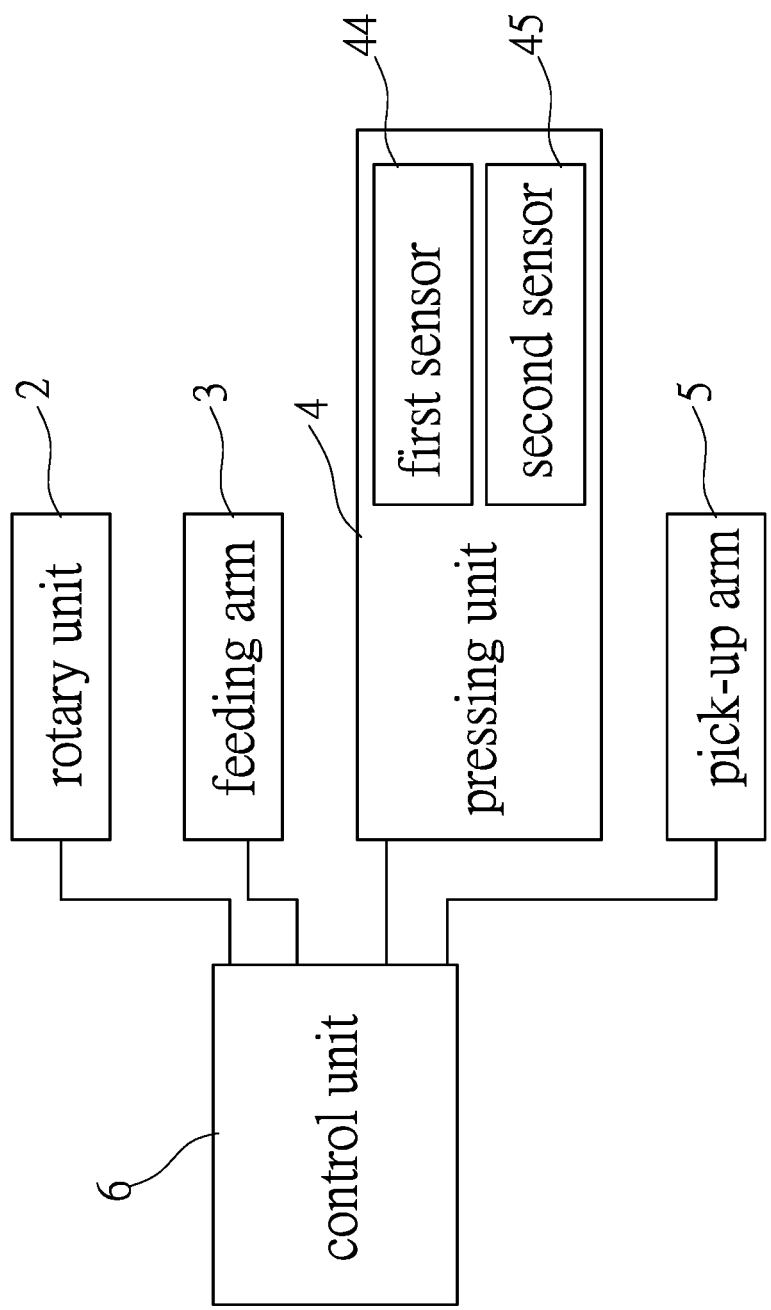
FIG. 2 illustrates block diagram of the circuit of the machine of the present invention.

Referring to FIGS. 1 to 10, the machine for making screwdriver bit sockets of the present invention is used to press a screwdriver bit 8 into a socket 7. The machine for making screwdriver bit sockets of the present invention comprises a feeding unit 1 having a pick-up area 11 for collecting sockets 7 to the pick-up area 11. A rotary unit 2 is located beside the feeding unit 1, and includes a feeding area 21, a put-in area 22, a pressing area 23 and a ready area 24. The rotary unit 2 including a round disk 25 which is rotatably connected to a base 26. Multiple holding units 27 are connected to the top of the disk 25 and located as a loop. The wherein the base 26 is driven by pneumatic power. The holding units 27 are moved to one of the feeding area 21, the put-in area 22, the pressing area 23 and the ready area 24 when the disk 25 rotates. A feeding arm 3 is located beside the pick-up area 11 and the feeding area 21. The feeding arm 3 is configured to move the sockets 7 from the pick-up area 11 to the holding units 27. A pressing unit 4 includes a head 41 which is retractably located above the pressing area 23. A pick-up arm 5 is located beside the ready area 24 and configured to pick up the sockets 7 from the holding units 27. A control unit 6 is electrically connected to the rotary unit 2, the feeding arm 3, the pressing unit 4 and the pick-up arm 5.

As shown in FIGS. 11 to 15, each of the holding units 27 includes a body 271 which includes a recess 272 formed in the top thereof. A reception member 273 is movably located in the recess 272 and defines a room 274 for receiving the socket 7. The body 271 includes a hole 275 defined radially therein which is a threaded hole. A positioning member 276, such as a screw is connected to the hole 275 and contacts against the reception member 273 so as to position the reception member 273.

Figure 3:
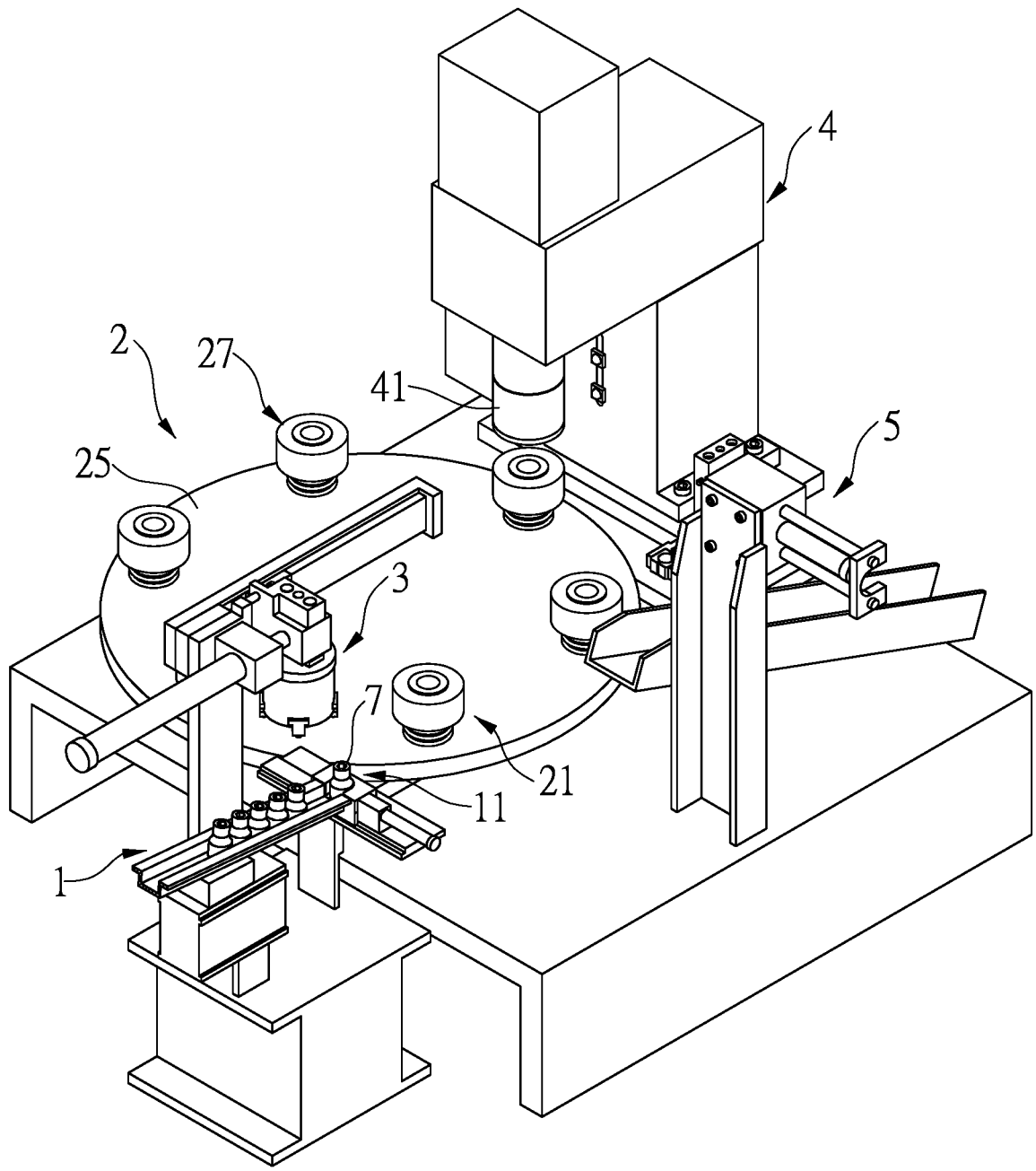
FIG. 3 shows that the sockets are located in the pick-up area.
Figure 4:
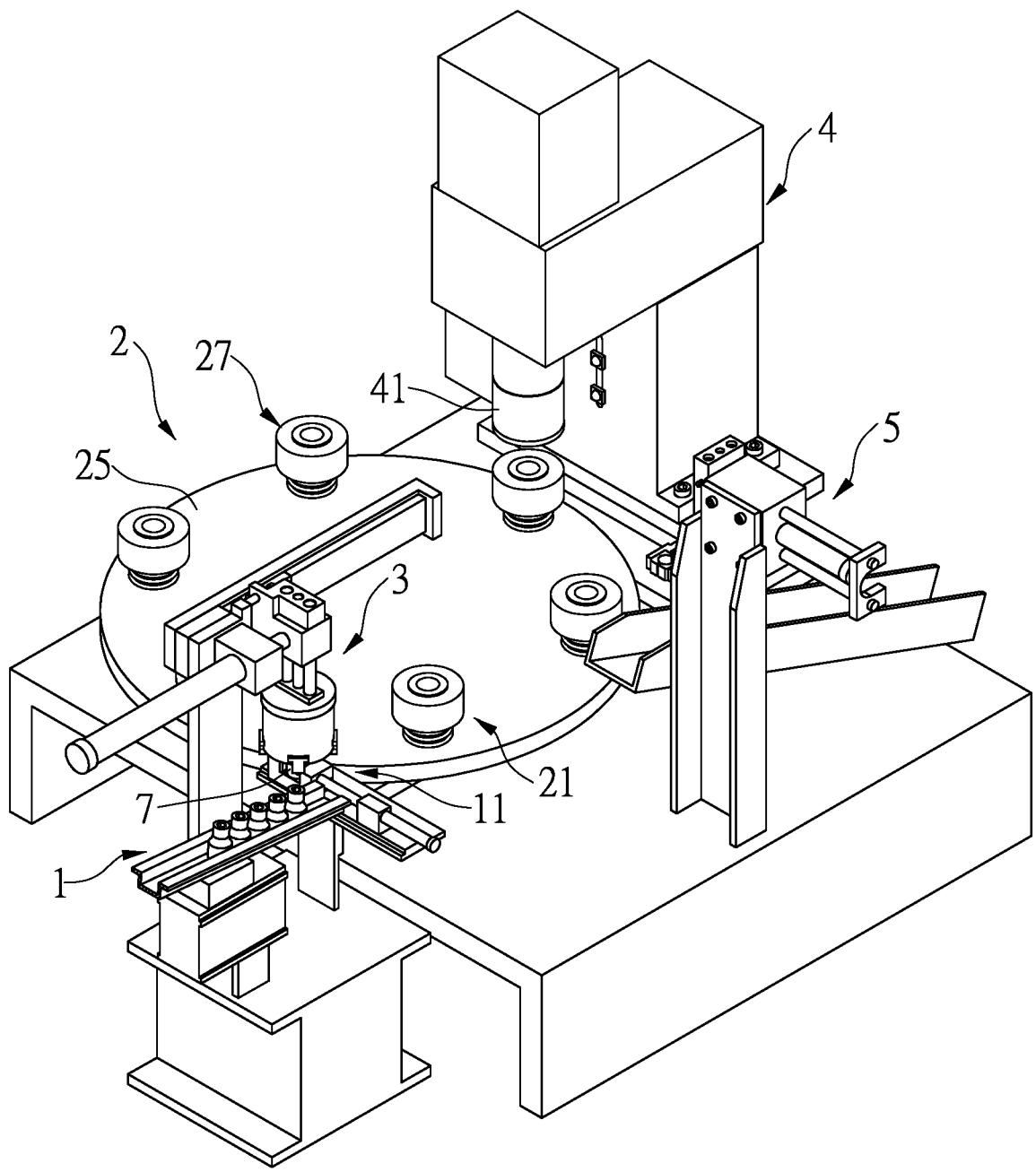
FIG. 4 shows that feeding arms picks the socket from the pick-up area.
Figure 5:
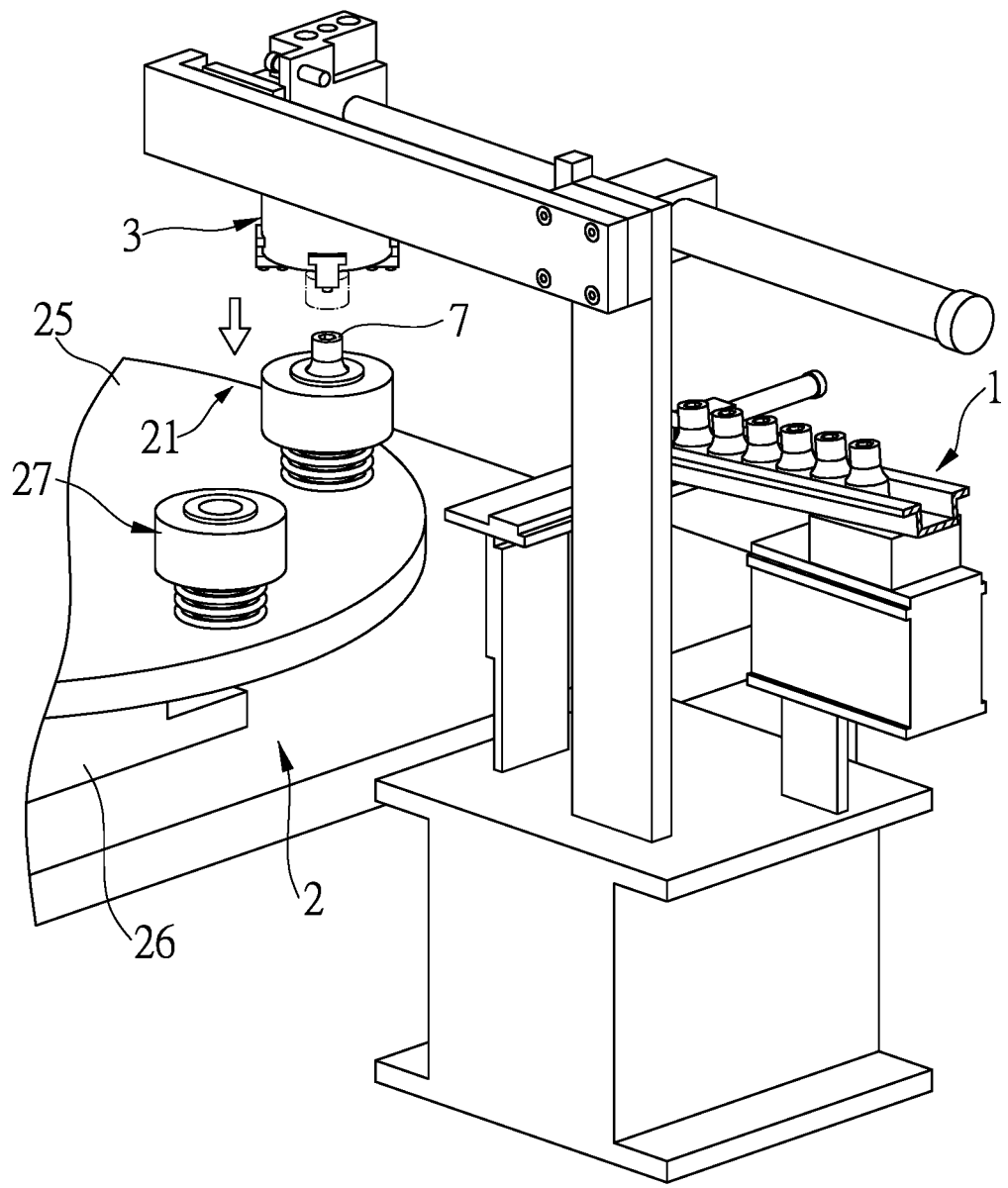
FIG. 5 shows that feeding arms puts the socket in the holding unit.
Figure 6:
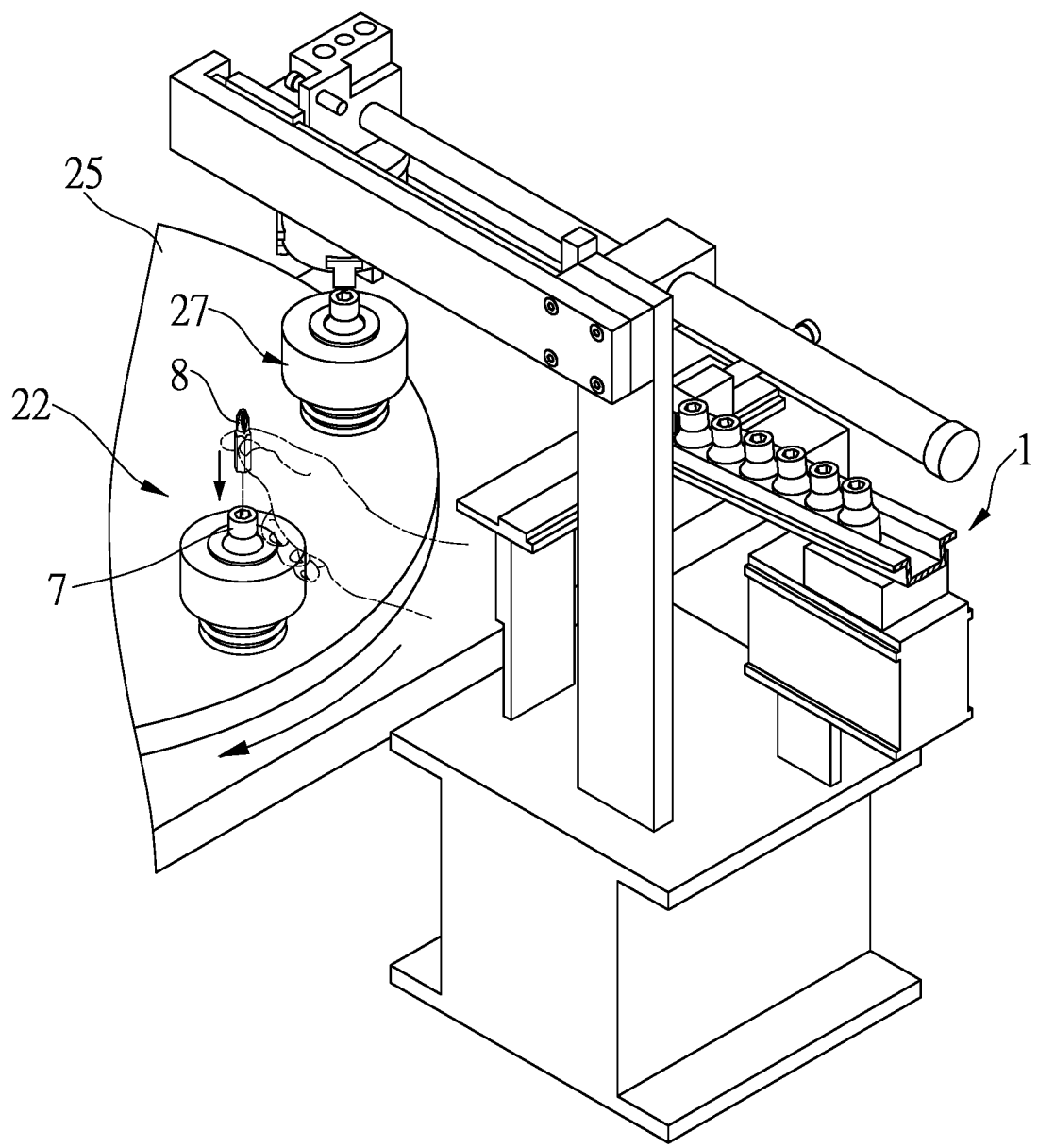
FIG. 6 shows that the socket is moved to the put-in area due to rotation of the disk.
Figure 7:
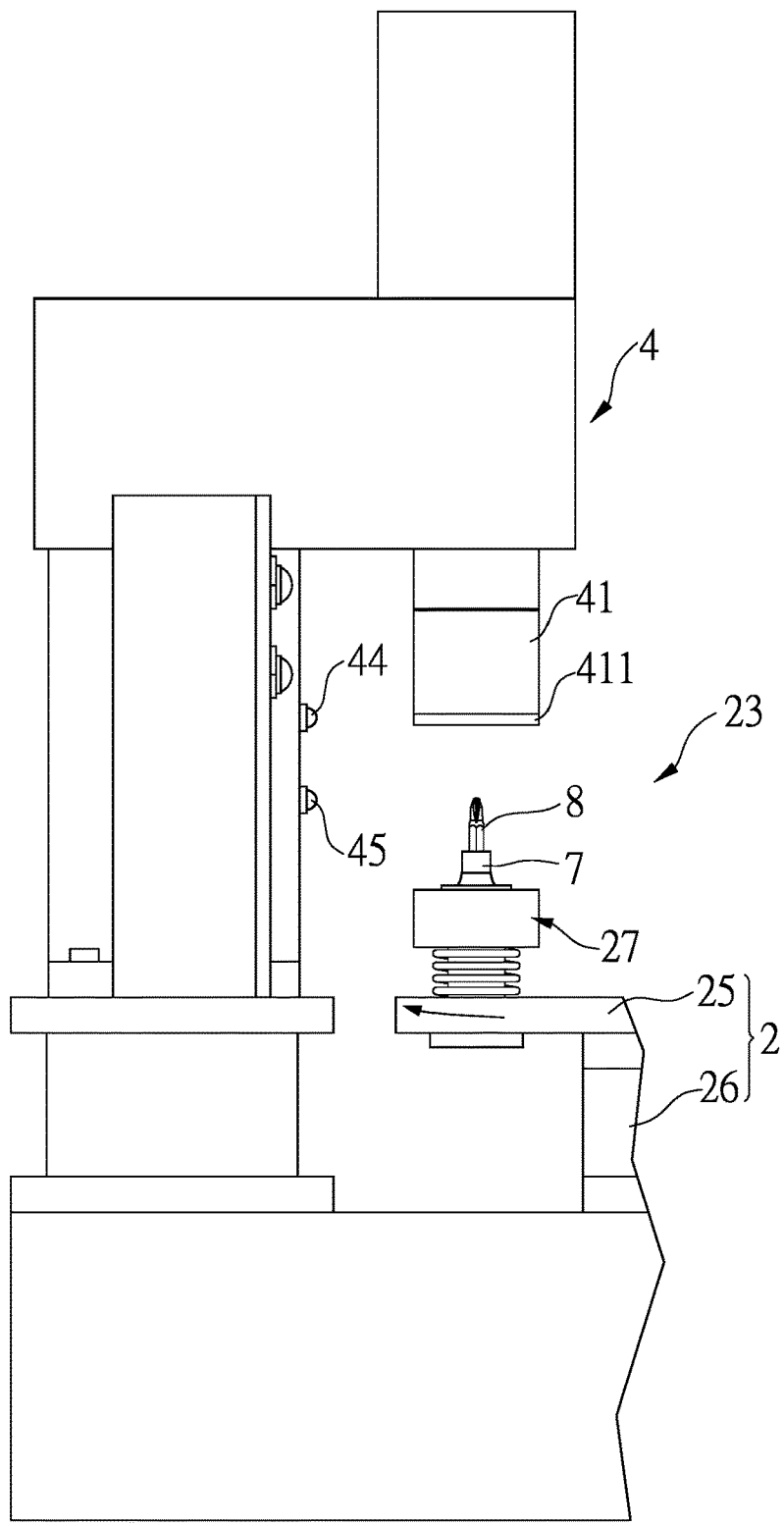
FIG. 7 shows that the socket is moved to the pressing area due to rotation of the disk.
Figure 8:
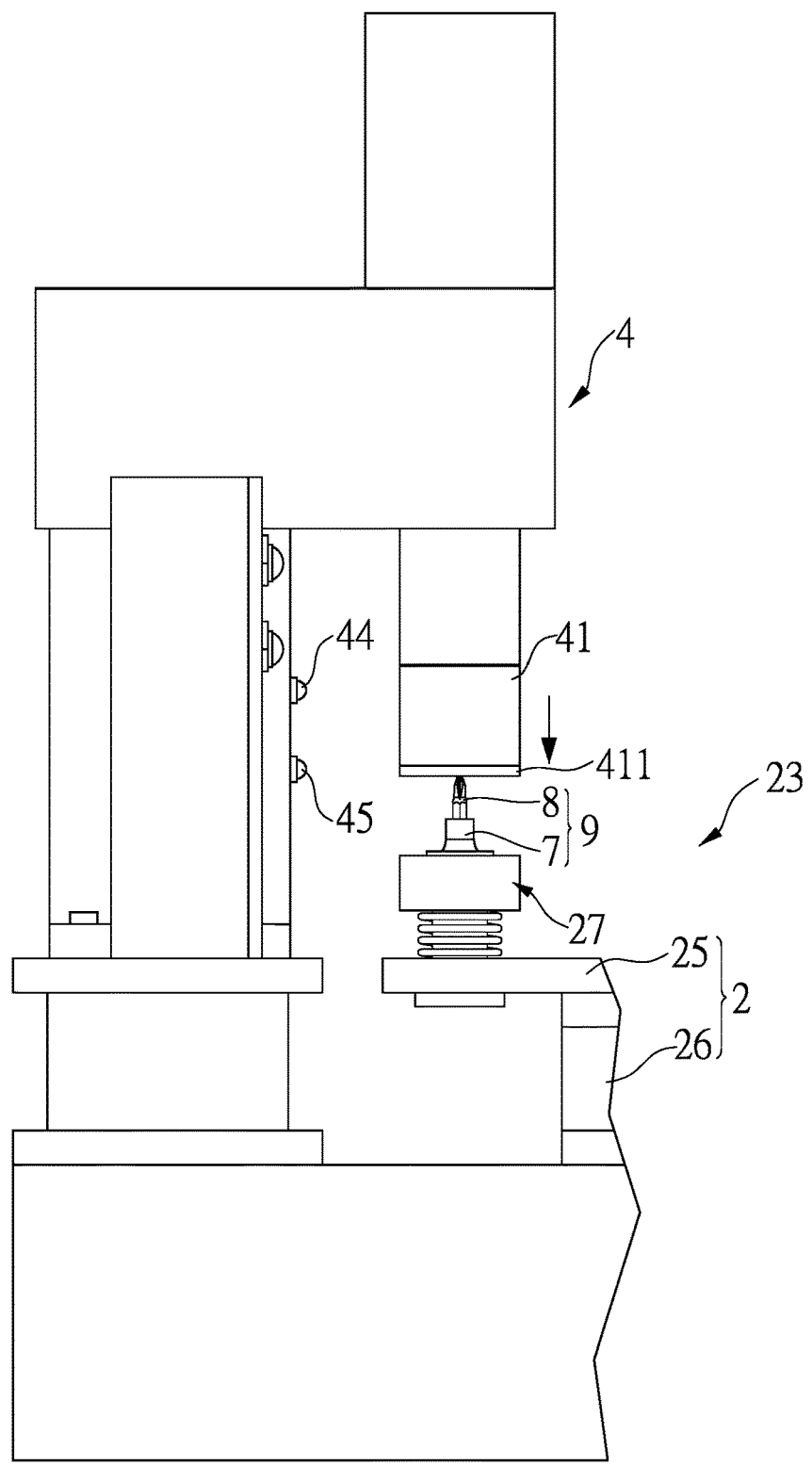
FIG. 8 shows that the screwdriver bit is pressed into the socket.
Figure 9:
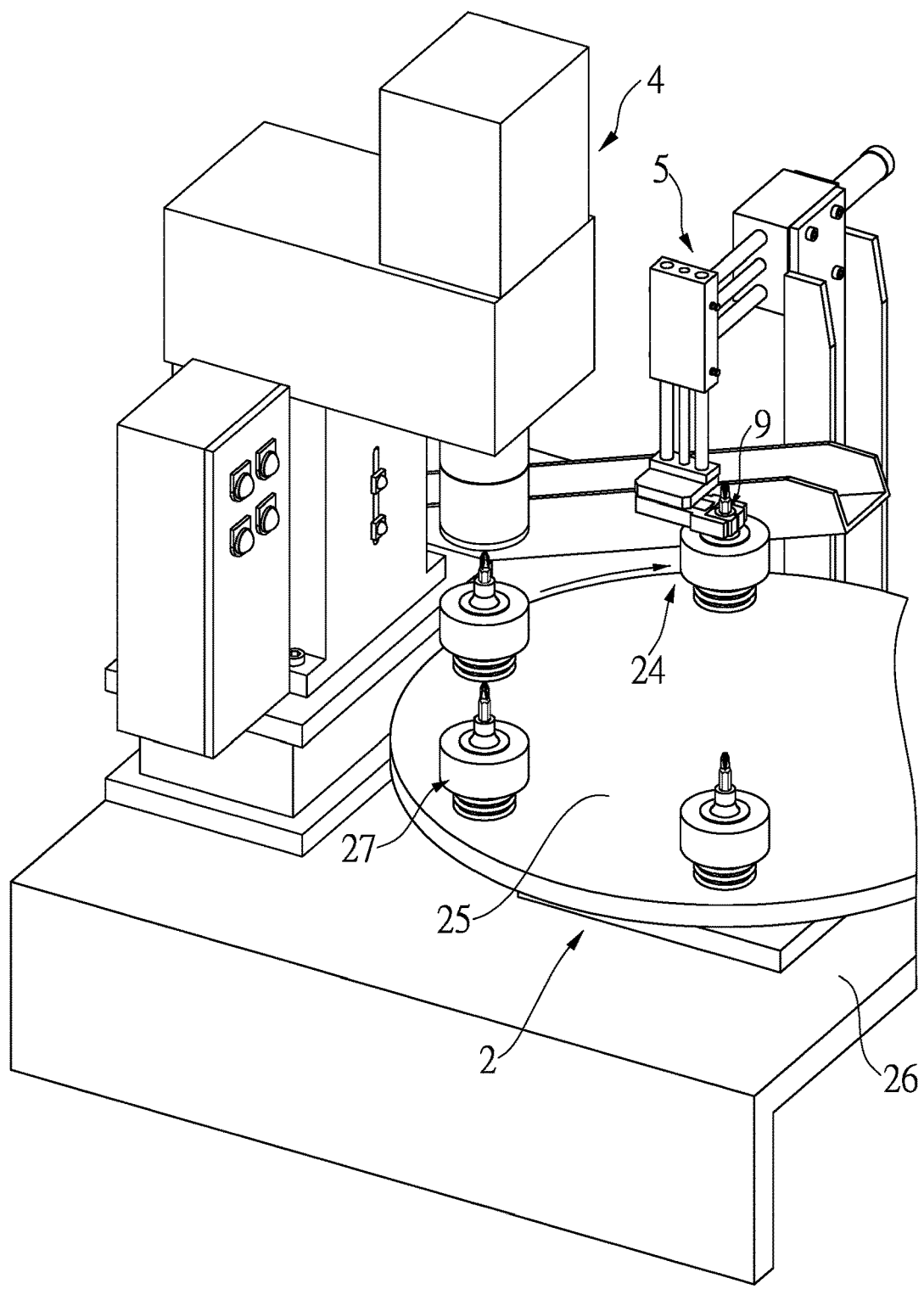
FIG. 9 shows that the socket is moved to the ready area due to rotation of the disk, and the pick-up arm is about to pick the screwdriver bit socket.
Figure 10:
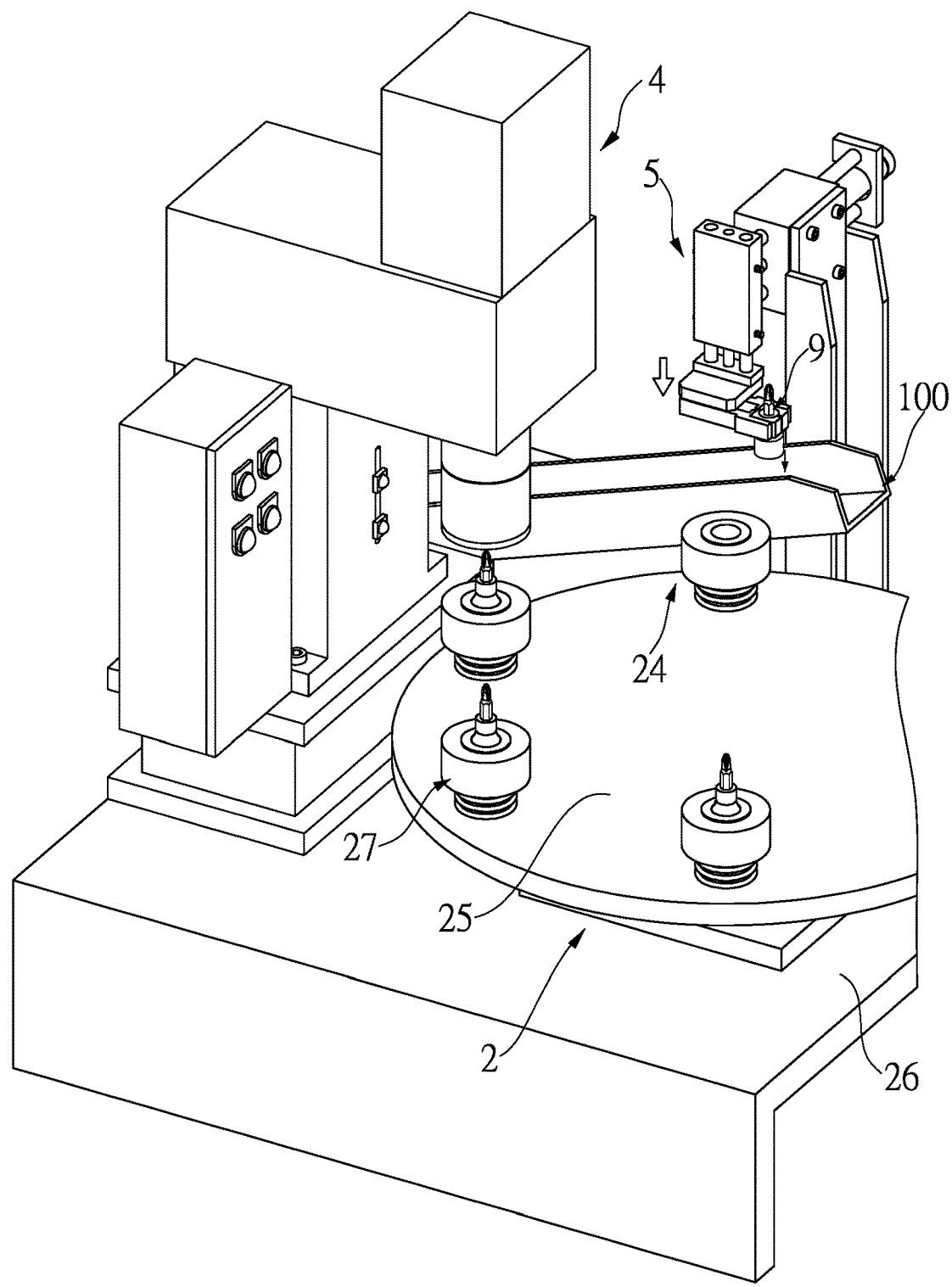
FIG. 10 shows that the pick-up arm moves the screwdriver bit socket to the collection rail.
Figure 11:
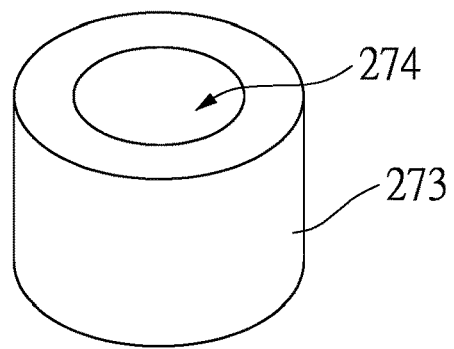
FIG. 11 shows the reception member of the machine of the present invention.
Figure 12:
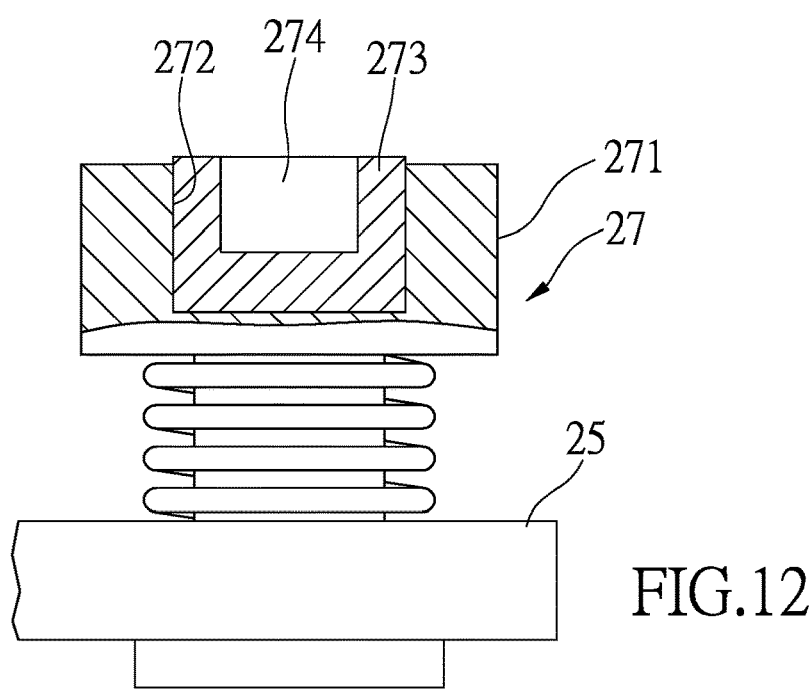
FIG. 12 is a cross sectional view, taken along line XII-XII in FIG. 1.
Figure 13:
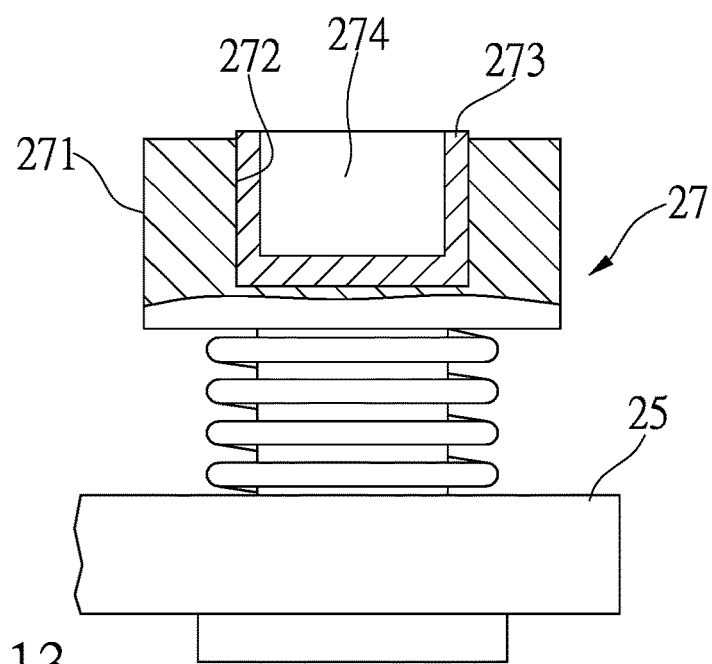
FIG. 13 shows that the reception member with larger room.

The sockets 7 are collected in the feeding unit 1, and the sockets 7 are fed to the pick-up area 11 as shown in FIG. 3. The feeding arm 3 picks the sockets 7 from the pick-up area 11 to the holding units 27 in the feeding area 21 as shown in FIGS. 3 and 4. The holding units 27 with the sockets 27 are moved to the put-in area 22 when the disk 25 rotates. As shown in FIG. 6, the screwdriver bit 8 is put to the top of the socket 7 manually or mechanically. The combination of the socket 7 and the screwdriver bit 8 is then moved to the pressing area 23 and located beneath the head 41 of the pressing unit 4 as shown in FIG. 7. As shown in FIG. 8, the head 41 is controlled to lower to secure the screwdriver bit 8 to the socket 7 to have a screwdriver bit socket 9. The disk 25 continues to rotate as shown in FIGS. 9 and 10, the screwdriver bit socket 9 is then moved to the ready area 24, and the pick-up arm 5 picks the screwdriver bit socket 9 and drops to the collection rail 100.

The manufacturing processes require limited labor and can produce the screwdriver bit sockets 9 efficiently. The size of the screwdriver bit sockets 9 can also be easily set by using the reception members 273 of different sizes. The pressing unit 4 is not located above the put-in area 22 to avoid from injury to the users.

Figure 16:
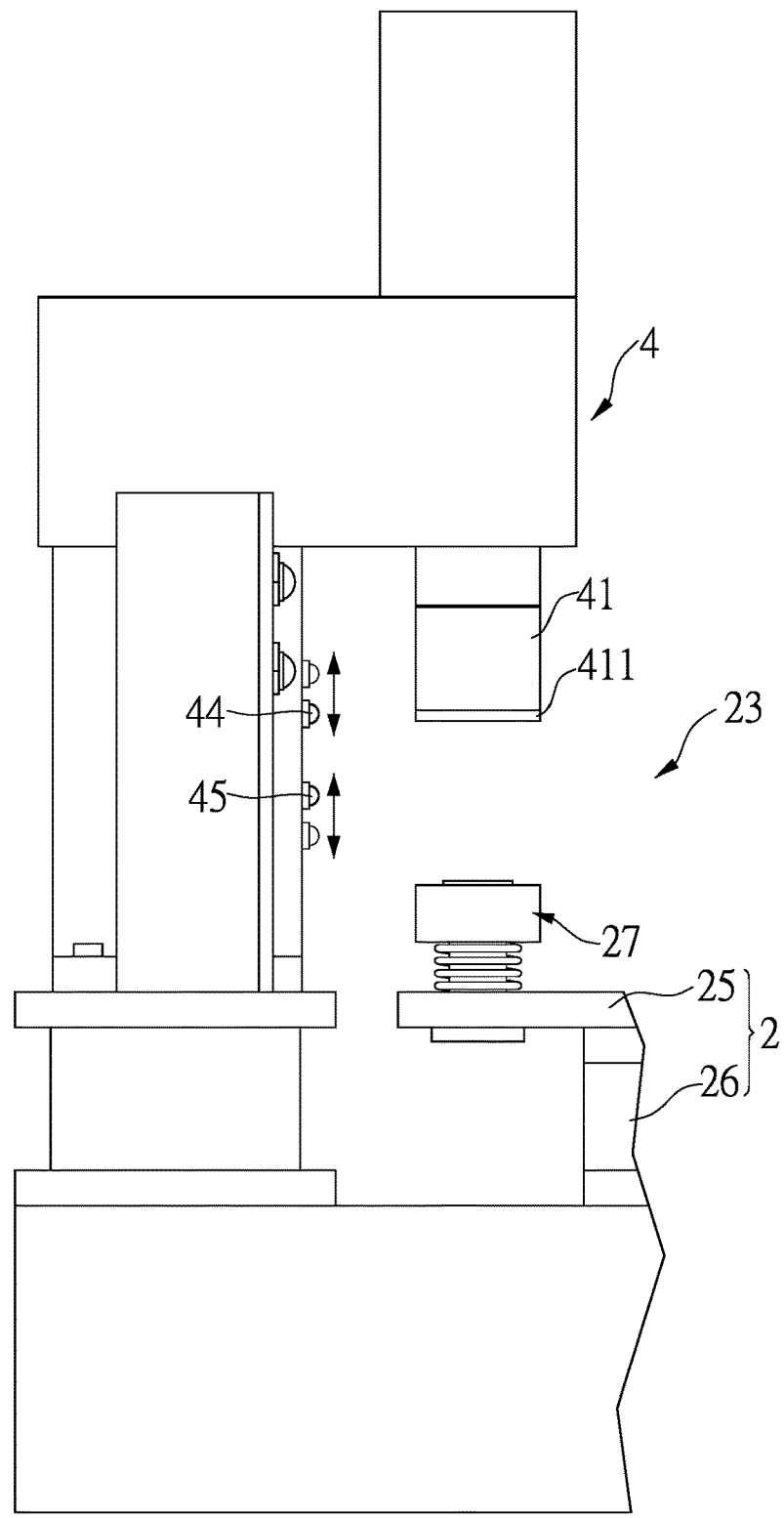
FIG. 16 shows that the first and second sensors are movable.
Figure 17:
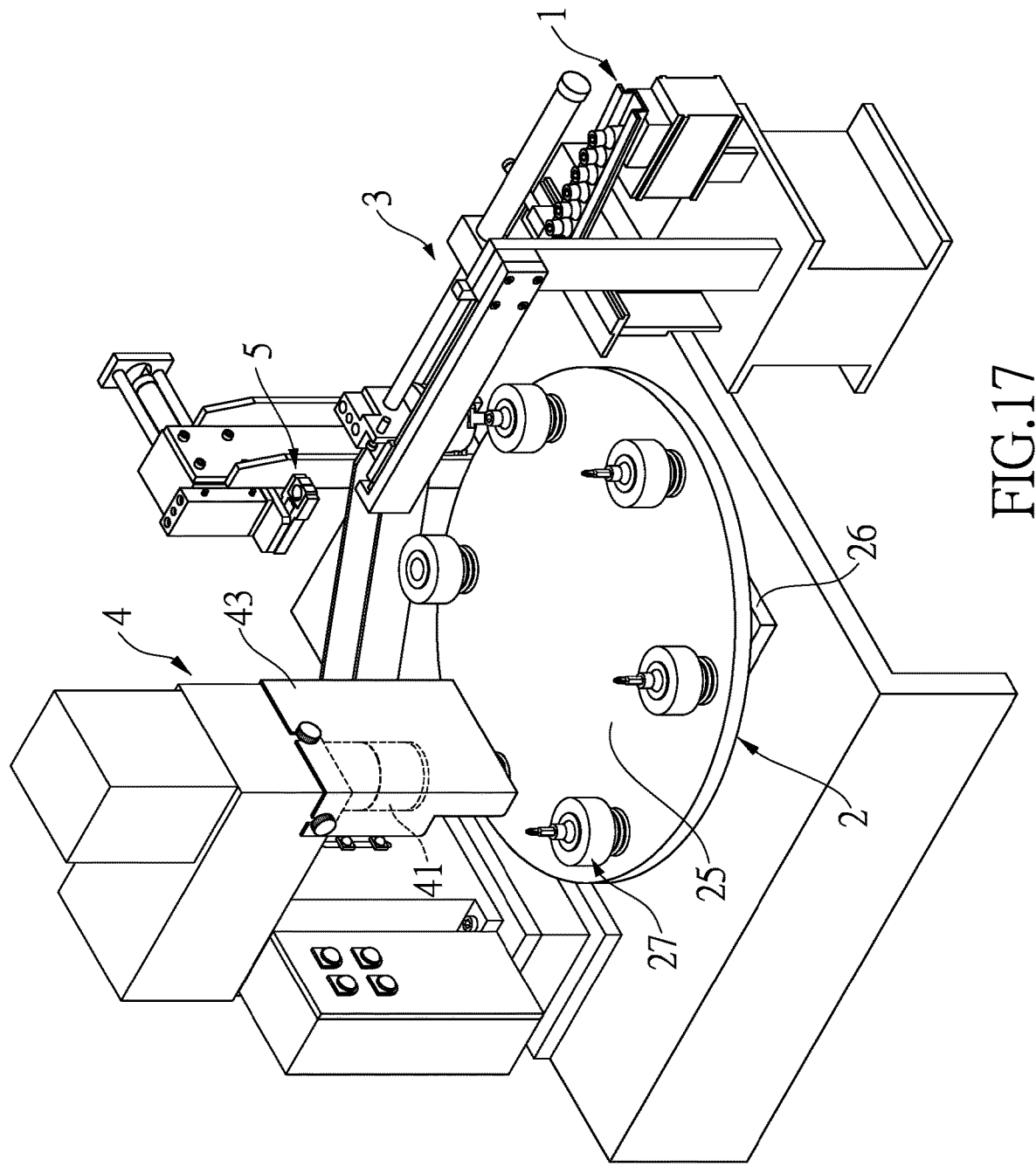
FIG. 17 shows that the pressing unit includes a protection board.
Figure 18:
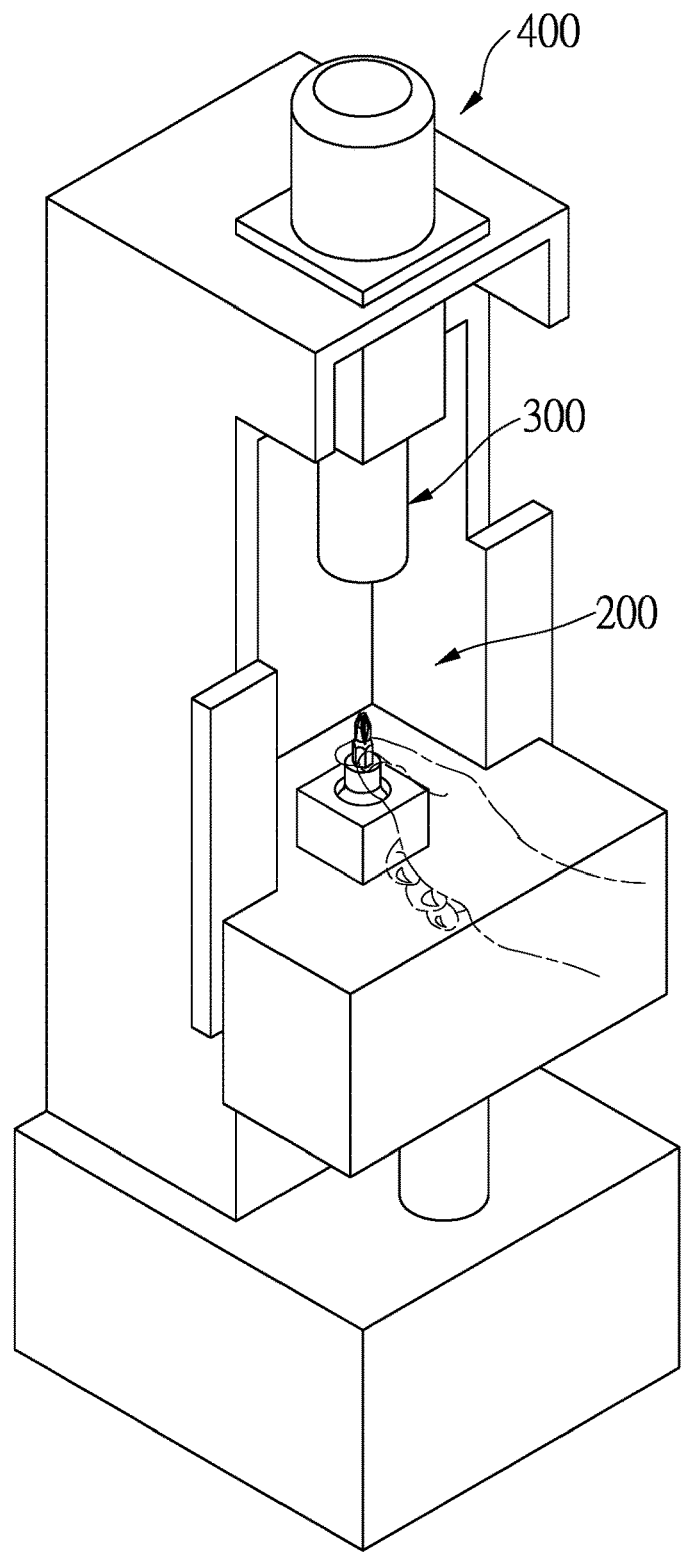
FIG. 18 shows the conventional machine for making screwdriver bit sockets.

As shown in FIGS. 7, 8 and 16, the pressing unit 4 includes a first sensor 44 and a second sensor 45, wherein the first sensor 44 and the second sensor 45 each are an infrared sensor and movable. The head 41 includes an infrared part 411. In this embodiment, the first sensor 44 detects the upper most position of the infrared part 411, and the second sensor 45 detects the lower most position of the infrared part 411. The first and second sensors 44, 45 detect the infrared part 411 so that the control unit 6 is acknowledged a position of the head 41. By setting the positions of the first and second sensors 44, 45, the travel distance of the head 41 can be adjusted to make the screwdriver bit sockets 9 of different sizes.

Figure 14:
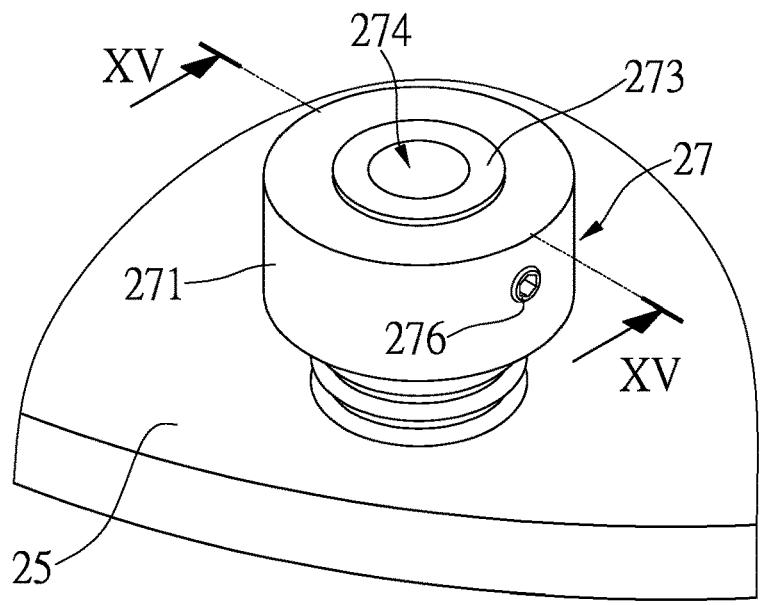
FIG. 14 shows that the body of the holding unit includes the positioning member.
Figure 15:
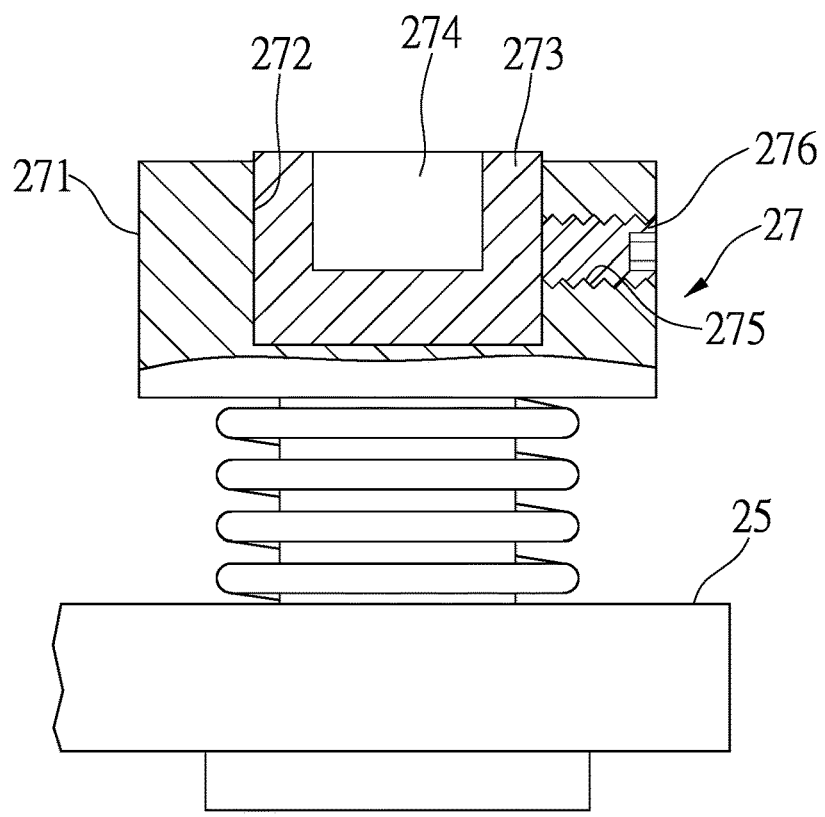
FIG. 15 is a cross sectional view, taken along line XV-XV in FIG. 14.

The pressing unit 4 includes a protection board 43 which is located beside the head 4 as shown in FIG. 14, so that the user's hand cannot reach the pressing unit 4.

While we have shown and described the embodiment in accordance with the present invention, it should be clear to those skilled in the art that further embodiments may be made without departing from the scope of the present invention.

What is claimed is:

1. A machine for making screwdriver bit sockets, comprising:
   a feeding unit having a pick-up area for collecting sockets to the pick-up area;
   a rotary unit located beside the feeding unit, and having a feeding area, a put-in area, a pressing area and a ready area, the rotary unit including a disk rotatably connected to a base, multiple bolding units connected to a top of the disk, the holding units being moved to one of the feeding area, the put-in area, the pressing area and the ready area when the disk rotates, each of the holding units including a body which includes a recess formed in a top thereof, a reception member movably located in the recess and defining a room, the body including a hole defined radially therein, a positioning member connected to the hole and positioning the reception member;
   a feeding arm located beside the pick-up area and the feeding area, the feeding arm configured to move the sockets from the pick-up area to the holding units;
   a pressing unit including a head which is retractably located above the pressing area;
   a pick-up arm located beside the ready area and configured to pick up the sockets from the holding units, and
   a control unit electrically connected to the rotary unit, the feeding arm, the pressing unit and the pick-up arm.

2. The machine as claimed in claim 1, wherein the pressing unit includes a first sensor and a second sensor, the first sensor and the second sensor each are an infrared sensor and movable, the head includes an infrared part, the first and second sensors detect the infrared part so that the control unit is acknowledged a position of the head.

3. The machine as claimed in claim 1, wherein the base is driven by pneumatic power.

4. The machine as claimed in claim 1, wherein the pressing unit includes a protection board which is located beside the head.

* * * * *